(12) United States Patent
Pettis

(10) Patent No.: US 7,083,838 B2
(45) Date of Patent: Aug. 1, 2006

(54) ELASTOMER AND POLYOLEFIN RESIN BASED FILMS AND ASSOCIATED METHODS

(75) Inventor: Rodney L. Pettis, Spartanburg, SC (US)

(73) Assignee: Exopack, L.L.C., Spartanburg, SC (US)

(*) Notice: Subject to any disclaimer, the term of this patent is extended or adjusted under 35 U.S.C. 154(b) by 4 days.

(21) Appl. No.: 10/760,337

(22) Filed: Jan. 20, 2004

(65) Prior Publication Data

US 2004/0137206 A1 Jul. 15, 2004

Related U.S. Application Data

(60) Provisional application No. 60/505,371, filed on Oct. 2, 2003.

(51) Int. Cl.
*B32B 27/28* (2006.01)
*B32B 27/32* (2006.01)

(52) U.S. Cl. ............... 428/34.9; 428/35.9; 428/339; 428/500; 428/515; 428/516; 428/520; 428/521

(58) Field of Classification Search ........... 428/34.9, 428/335–336, 339, 500, 515–516, 520–521, 428/35.9
See application file for complete search history.

(56) References Cited

U.S. PATENT DOCUMENTS

| | | | |
|---|---|---|---|
| 3,580,380 A * | 5/1971 | Phillips | 198/376 |
| 4,424,253 A * | 1/1984 | Anderson | 428/215 |
| 4,493,127 A | 1/1985 | Blanke, Jr. et al. | |
| 4,756,629 A | 7/1988 | Tilman et al. | |
| 4,897,174 A | 1/1990 | Wang et al. | |
| 4,946,289 A | 8/1990 | Bolling et al. | |
| 4,952,441 A | 8/1990 | Bose et al. | |
| 4,994,324 A | 2/1991 | Bose et al. | |
| 5,038,009 A | 8/1991 | Babbitt | |
| 5,051,284 A | 9/1991 | Johansson et al. | |
| 5,106,677 A | 4/1992 | Yeh et al. | |
| 5,158,836 A | 10/1992 | Schirmer et al. | |
| 5,171,594 A | 12/1992 | Babbitt | |
| 5,219,666 A | 6/1993 | Schirmer et al. | |
| 5,319,033 A | 6/1994 | Trepka et al. | |

(Continued)

FOREIGN PATENT DOCUMENTS

GB  2 351 039 A  12/2000

(Continued)

OTHER PUBLICATIONS

Jan H. Schut, Polystyrene Blown Film Starts to Get Some Respect, *Plastics Technology*, Nov. 2002, available at Online, www.plasticstechnology.com/articles/200011fa1.html.

*Primary Examiner*—Harold Pyon
*Assistant Examiner*—Sow-Fun Hon
(74) *Attorney, Agent, or Firm*—Stoel Rives LLP

(57) ABSTRACT

A packaging film having enhanced optical and mechanical properties so that a product surrounded by the film is clearly visible through the film and the film is sufficiently durable to be useful as packaging film. The packaging film including a first layer of elastomer; a second layer of polyolefin having a first surface abuttingly contacting a first surface of the elastomer; and a third layer of elastomer abuttingly contacting a second surface of the polyolefin. The second layer of polyolefin is positioned between the first and third layers of elastomer. The packaging film can also include oxygen barrier properties useful in applications requiring relatively high protection from oxygen and moisture.

30 Claims, 14 Drawing Sheets

U.S. PATENT DOCUMENTS

| | | |
|---|---|---|
| 5,345,399 A | 9/1994 | Collins |
| 5,456,979 A | 10/1995 | Schirmer |
| 5,482,376 A | 1/1996 | Moseley et al. |
| 5,488,220 A | 1/1996 | Freeks et al. |
| 5,523,136 A | 6/1996 | Fischer et al. |
| 5,529,396 A | 6/1996 | Pryor et al. |
| 5,558,438 A | 9/1996 | Warr |
| 5,560,296 A | 10/1996 | Adams |
| 5,593,229 A | 1/1997 | Warr |
| 5,601,369 A | 2/1997 | Moseley et al. |
| 5,611,626 A | 3/1997 | Warr |
| 5,658,625 A | 8/1997 | Bradfute et al. |
| 5,663,002 A | 9/1997 | Schirmer |
| 5,728,037 A | 3/1998 | Pryor et al. |
| 5,756,577 A | 5/1998 | Gutierrez-Villarreal |
| 5,770,839 A | 6/1998 | Ruebush et al. |
| 5,783,270 A | 7/1998 | Fischer et al. |
| 5,834,077 A | 11/1998 | Babrowicz |
| 5,837,355 A | 11/1998 | Hayai |
| 5,871,790 A | 2/1999 | Monier et al. |
| 5,972,519 A | 10/1999 | Niessner et al. |
| 6,019,713 A | 2/2000 | Scypinski et al. |
| 6,022,612 A | 2/2000 | Wilkie |
| 6,046,443 A | 4/2000 | Ackerman et al. |
| 6,060,136 A | 5/2000 | Patrick et al. |
| 6,065,871 A | 5/2000 | Warr |
| 6,231,232 B1 | 5/2001 | Warr |
| 6,248,850 B1 | 6/2001 | Arai |
| 6,255,388 B1 | 7/2001 | Yamada et al. |
| 6,270,866 B1 | 8/2001 | Okuda et al. |
| 6,294,210 B1 | 9/2001 | Kuo |
| 6,299,351 B1 | 10/2001 | Warr |
| 6,299,968 B1 | 10/2001 | Karaoglu et al. |
| 6,333,061 B1 | 12/2001 | Vadhar |
| 6,342,282 B1 | 1/2002 | Yoshii et al. |
| 6,375,981 B1 | 4/2002 | Gilleland et al. |
| RE37,699 E | 5/2002 | Bradfute et al. |
| 6,402,379 B1 | 6/2002 | Albright |
| 6,403,005 B1 | 6/2002 | Mientus et al. |
| 6,406,763 B1 | 6/2002 | Wolf et al. |
| 6,413,596 B1 | 7/2002 | Okuda et al. |
| 6,417,307 B1 | 7/2002 | Oi et al. |
| 6,417,308 B1 | 7/2002 | Arai et al. |
| 6,479,138 B1 | 11/2002 | Childress |
| 6,517,950 B1 | 2/2003 | Patrick et al. |
| 6,528,088 B1 | 3/2003 | Gilleland et al. |
| 6,609,999 B1 | 8/2003 | Albright |
| 6,821,610 B1 * | 11/2004 | Hamulski et al. ........... 428/198 |
| 6,893,686 B1 | 5/2005 | Egan |
| 2004/0038792 A1 | 2/2004 | Albright |
| 2004/0091648 A1 | 5/2004 | Hartzell et al. |
| 2004/0136616 A1 | 7/2004 | Allen et al. |
| 2004/0137206 A1 | 7/2004 | Pettis |
| 2004/0175060 A1 | 9/2004 | Woodham et al. |
| 2004/0228547 A1 | 11/2004 | Hartzell et al. |
| 2005/0008736 A1 | 1/2005 | Egan |

FOREIGN PATENT DOCUMENTS

| | | |
|---|---|---|
| WO | WO 00/53429 A1 | 9/2000 |
| WO | WO 01/94451 A2 | 12/2001 |

\* cited by examiner

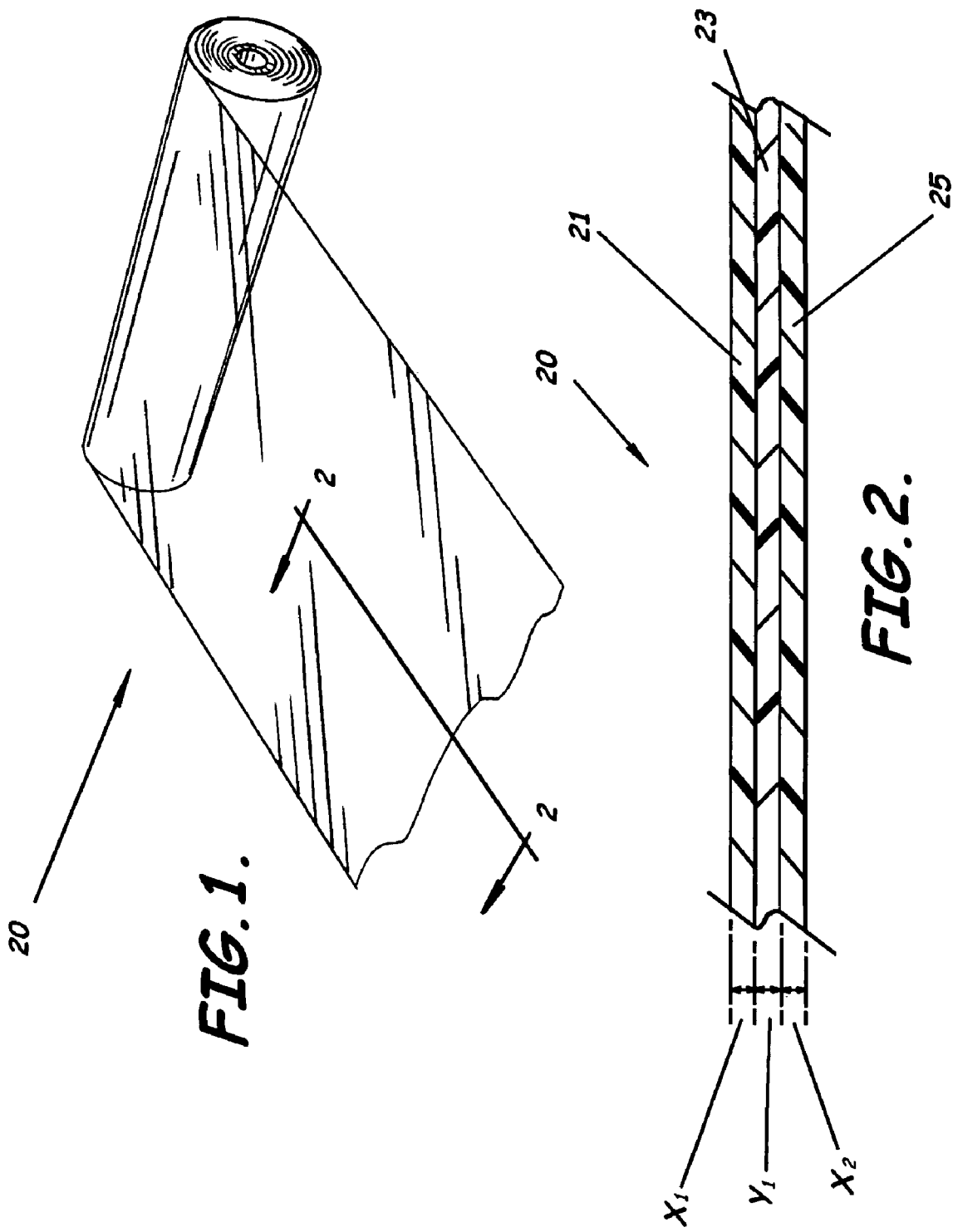

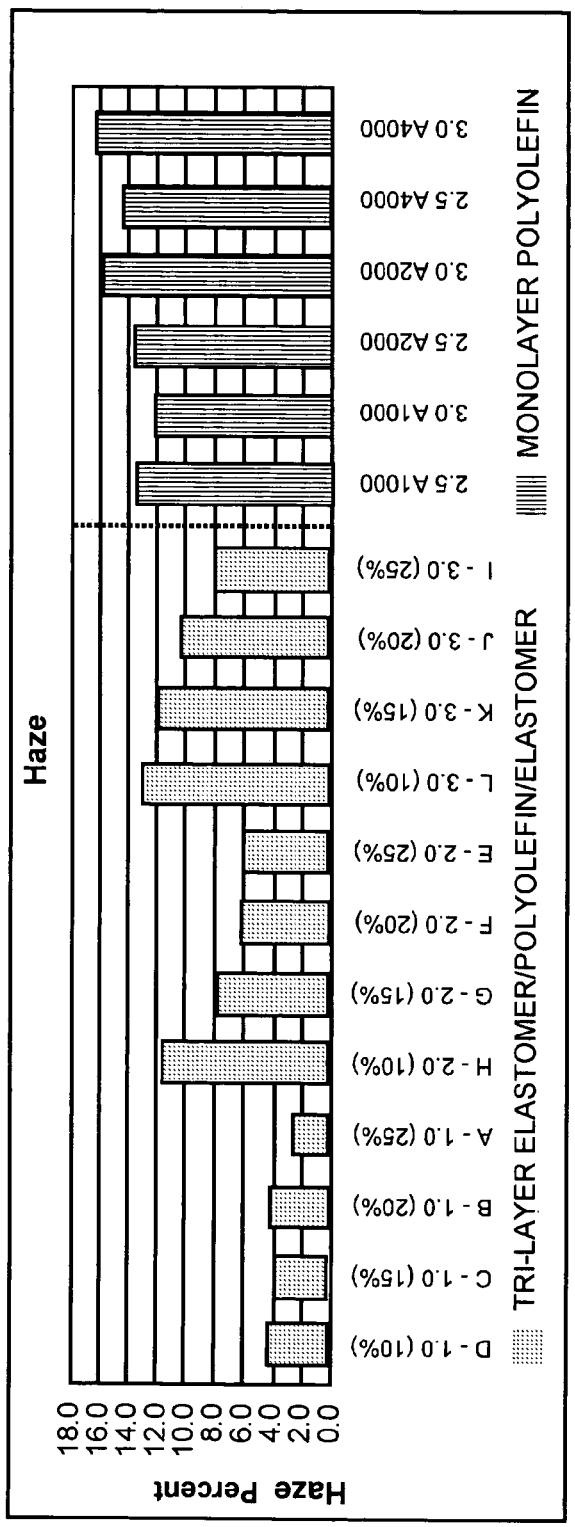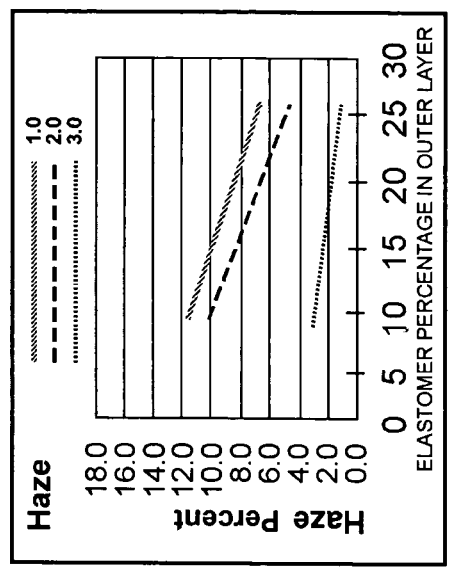
FIG. 5A.
FIG. 5B.

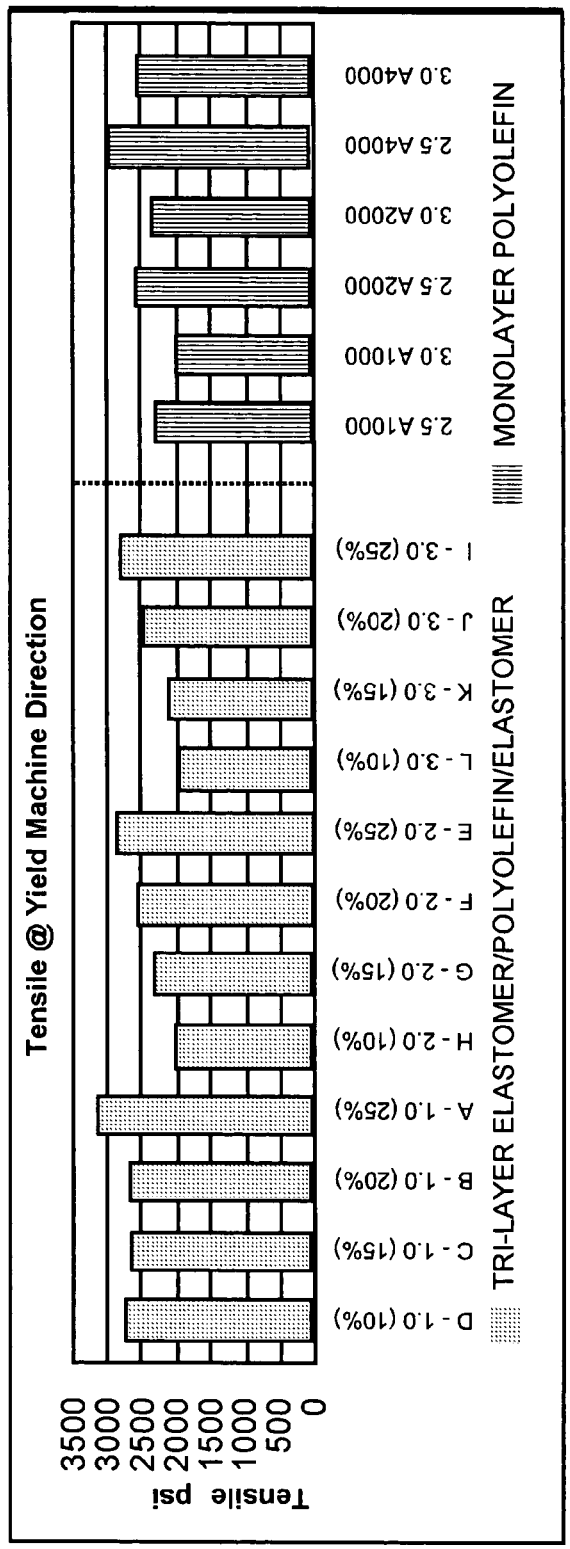
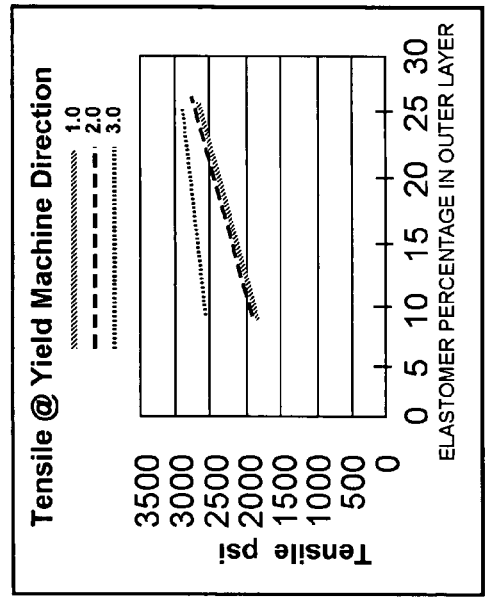
FIG. 9A.
FIG. 9B.

ELASTOMER AND POLYOLEFIN RESIN BASED FILMS AND ASSOCIATED METHODS

RELATED APPLICATIONS

This application claims the benefit of a provisional application having U.S. Ser. No. 60/505,371, filed on Oct. 2, 2003, which hereby is incorporated by reference in its entirety.

BACKGROUND OF THE INVENTION

1. Field of the Invention

The present invention relates to multilayer films, specifically multilayer films that also can be used as packaging films. More specifically, the present invention is directed to multilayer films having relatively low haze and high gloss properties and associated methods of forming and using same.

2. Description of Related Art

Multilayered films are used in many industries to package all types of consumer goods, such as food, bottles, canned items, cleaning supplies, compact discs, and many more items. Numerous attempts have been made to manufacture packaging films that provide sufficient clarity and strength to allow consumers to clearly see the product through the packaging and also protect the product from the atmosphere or protect the atmosphere from the product.

Films can be used to wrap products directly or can be used to form bags that contain consumer products. Previous attempts have been made to use films that can be used to package consumer products that need transparent packaging, such as produce. Some of these films have been manufactured with an outer heat-resistant layer of elastomer, such as a styrene-butadiene copolymer, with an outer sealant layer of a metallocene-catalyzed ethylene/alpha-olefin copolymer. Films with these types of materials have generally been found to curl, making them very difficult to process through traditional film manufacturing machinery.

Another example film with an elastomer on an outer layer with polyolefins disposed on a second and third layer can be found in U.S. Pat. No. 5,523,136 by Fischer et al. titled Packaging Film, Packages, and Methods of Using Them (hereinafter "Fischer '136 Patent"). The Fischer '136 Patent describes a multilayer film with an elastomer on a first outermost layer with an ethylene layer as the central layer and as another outermost layer. Because the films described in the Fischer '136 Patent are not symmetrical in structure, the films also tend to curl, which makes them very difficult to machine.

To combat problems with curling, more structurally symmetrical films have been developed. An example of such a structurally symmetrical film can be found in U.S. Pat. No. 6,294,210 by Kuo titled Oxygen Permeable Multilayer Film (hereinafter "Kuo '210 Patent"). The Kuo '210 Patent describes a film that has a first layer of a homogeneous ethylene/α-olefin copolymer, a second layer of a polyolefin, and a third layer of the homogeneous ethylene/α-olefin copolymer that can be used to package produce and the like. Additional layers can be added as well. Because a thicker film must be used in some applications to provide the needed film strength, films made primarily of polyolefin tend to be hazy when they are produced with thicker film gauges.

To attempt to make stronger films, others have attempted to make packaging films with varying chemical compounds that are known for providing strength. An example packaging film that uses a chemical compound that is known to increase strength can be found in U.S. Pat. No. 6,060,136 by Patrick et al. titled High Modulus Oxygen-Permeable Multilayer Film (hereinafter "Patrick '136 Patent"). The Patrick '136 Patent describes a structurally symmetrical multilayer film including a first layer of a homogeneous ethylene/alpha-olefin copolymer, a second layer of a thermoplastic elastomer, and a third layer of the homogeneous ethylene/alpha-olefin copolymer. Additional layers can be added. Thermoplastic elastomers are known to increase strength in films. The film of the Patrick '136 Patent is used for packaging food and requires a high oxygen transmission rate to ensure that the produce contained within the film receives enough oxygen to remain fresh. The core layer of the thermoplastic elastomer of a multilayer film is generally the center layer of the film, which is also generally the thickest layer. Because the thermoplastic elastomer material used in the center layer is relatively expensive, the cost of producing a film in accordance with the Patrick '136 Patent can be expensive. Films made with thermoplastic elastomers also lack optical properties that may be important in other applications.

A need exists for a packaging film that is economical to produce and can be manufactured on existing equipment, without having to modify the equipment. There also is a continued need for a packaging film that is relatively thin, has good optical properties to allow a product to be seen easily through the packaging film, and has good mechanical properties to allow the packaging film to withstand outward forces being applied to the packaging without puncturing easily.

SUMMARY OF THE INVENTION

In view of the foregoing, embodiments of the present invention advantageously provide a packaging film that is relatively thin and has enhanced optical and mechanical properties. The enhanced optical and mechanical properties allow a product when substantially surrounded by the film to be seen clearly through the packaging film and also allow the packaging film to resist from being punctured easily when an outside force is applied to the packaging film. Embodiments of the present invention also advantageously provide a packaging film that is relatively inexpensive to produce and can be produced using known film manufacturing equipment.

More specifically, an embodiment of the present invention provides a combination product and shrink wrap packaging film that preferably includes a product that is substantially surrounded by the packaging film. The packaging film preferably contacts and substantially surrounds the product so that when the packaging film is heated to shrink the packaging film around the product, the packaging film encases the product so that the product is securely restrained by the packaging film. This type of film is commonly referred to as shrink-wrap film. The packaging film preferably includes a first outermost layer of elastomer, a second layer of polyolefin, and a third outermost layer of elastomer. The second layer of polyolefin preferably overlies and abuttingly contacts the first outermost layer of elastomer. The third outermost layer of elastomer preferably overlies and abuttingly contacts the second layer of the polyolefin so that the second layer of polyolefin is preferably positioned between the first and the third outermost layers of elastomer. The packaging film advantageously has enhanced optical and mechanical properties for a selected overall packaging film gauge thickness that allow the product to be seen more clearly through the packaging film and that increase modulus for the packaging film so that the packaging film is readily usable with packaging machinery, i.e., machinable, at relatively high speeds and provides packaging film having preselected optical and mechanical properties related to appearance, strength, and shrink. Conventional packaging machinery can be used, as understood by those of ordinary skill in the art.

Embodiments of the present invention also advantageously provide a packaging film that has enhanced optical and mechanical properties. The packaging film preferably includes a first layer of a sheet of elastomer, a second layer of polyolefin, and a third layer of a sheet of elastomer. The second layer of polyolefin preferably has a first surface that abuttingly contacts a first surface of the first layer of the sheet of elastomer. The third layer of the sheet of elastomer preferably abuttingly contacts a second surface of the second layer of polyolefin. The second layer of polyolefin is preferably positioned between the first and third layers of the sheets of elastomer.

The packaging film advantageously has enhanced optical properties and enhanced mechanical properties for a selected overall packaging film gauge thickness so that a product surrounded by the packaging film can be seen more clearly through the packaging film without the necessity of removing the packaging film and the packaging film is not easily punctured when an outside force is applied thereto. The packaging film of the present invention is advantageously capable of being readily usable with packaging machinery, i.e., machinable, at relatively high speeds and provides packaging film having preselected optical and mechanical properties related to appearance, strength, and shrink properties. For example, the packaging film of the present invention can have a 45° gloss in a range of about 70% to about 110%.

Methods of forming the packaging film with enhanced optical and mechanical properties are also advantageously provided. In one embodiment, the method of forming a packaging film having enhanced optical and mechanical properties advantageously includes positioning a first extruded layer of elastomer, a second layer of polyolefin and a third extruded layer of elastomer so that the first and third extruded layers of elastomer are the outermost layers of the packaging film. The packaging film can be produced by a blown film process, as understood by those of ordinary skill in the art of packaging films. As a step of the blown film process, the layered laminar structure is stretched and air is supplied to the layered laminar structure to produce a bubble. The bubble is then collapsed, typically by rollers, to form the packaging film. The packaging film preferably has a second layer of polyolefin positioned between first and third outermost layers of elastomer. The packaging film advantageously has enhanced optical and mechanical properties for a selected overall packaging film gauge thickness that allow a product surrounded by the packaging film to be seen more clearly through the packaging film and that increase modulus for the packaging film so that the packaging is readily usable with packaging machinery, i.e., machinable, at relatively high speeds and provides packaging film having preselected optical and mechanical properties for the packaging film related to appearance, strength, and shrink properties.

Another embodiment of a method of forming a packaging film having enhanced optical and mechanical properties so that a product surrounded by the packaging film can be seen more clearly through the packaging film and the packaging film is not punctured easily when an outside force is applied thereto. In this embodiment, the method preferably includes the step of positioning a first extruded layer of elastomer, a second extruded layer of polyolefin, and a third extruded layer of elastomer to form the packaging film. The packaging film is preferably formed by using a cast film process, as understood by those of ordinary skill in the art of packaging film production. As a step of the cast film process, the layered structure of the layers of extruded materials is rolled to form a packaging film. In the packaging film, the second layer of polyolefin is preferably positioned between the first and the third layers of elastomer. The packaging film advantageously has enhanced optical and mechanical properties for a selected overall packaging film gauge thickness.

The enhanced Optical and mechanical properties advantageously allow a product surrounded by the packaging film to be seen more clearly through the packaging film. The enhanced properties also increase modulus in the packaging film so that the packaging film is readily usable with packaging machinery, i.e., machinable, at relatively high speeds and providespackaging filmhavingpreselected optical and mechanical properties related to appearance, strength, and shrink properties.

The packaging film of the present invention has very low haze and high gloss properties that allow indicia on a product to be seen easily through the packaging film without having to remove the packaging film from the product. The packaging film also has high gloss values that make the combination product and film packaging more aesthetically appealing to consumers.

BRIEF DESCRIPTION OF THE DRAWINGS

Some of the objects and advantages of the present invention having been stated, others will become apparent as the description proceeds when taken in conjunction with the accompanying drawings, in which:

FIG. 1 is a perspective view of a roll of a packaging film in accordance with an embodiment of the present invention;

FIG. 2 is a fragmentary sectional view of the packaging film of FIG. 1 taken along the line 2—2 in accordance with an embodiment of the present invention;

FIG. 5A is a bar graph illustrating the percentage of haze for a plurality of tested film samples that were each formed in accordance with an embodiment of the present invention;

FIG. 5B is a graph illustrating the percentage of haze for a plurality of tested film samples that were formed in accordance with an embodiment of the present invention grouped according to the percentage of elastomer contained in a first outer layer of the packaging film;

FIG. 9A is a graph illustrating the tensile at yield in a machine direction measured in psi for each sample that was tested in accordance with an embodiment of the present invention;

FIG. 9B is a graph illustrating the tensile at yield in a machine direction measured in psi for each sample that was tested in accordance with an embodiment of the present invention grouped according to the percentage of elastomer contained in a first outer layer of the packaging film;

DETAILED DESCRIPTION

Figure 3:
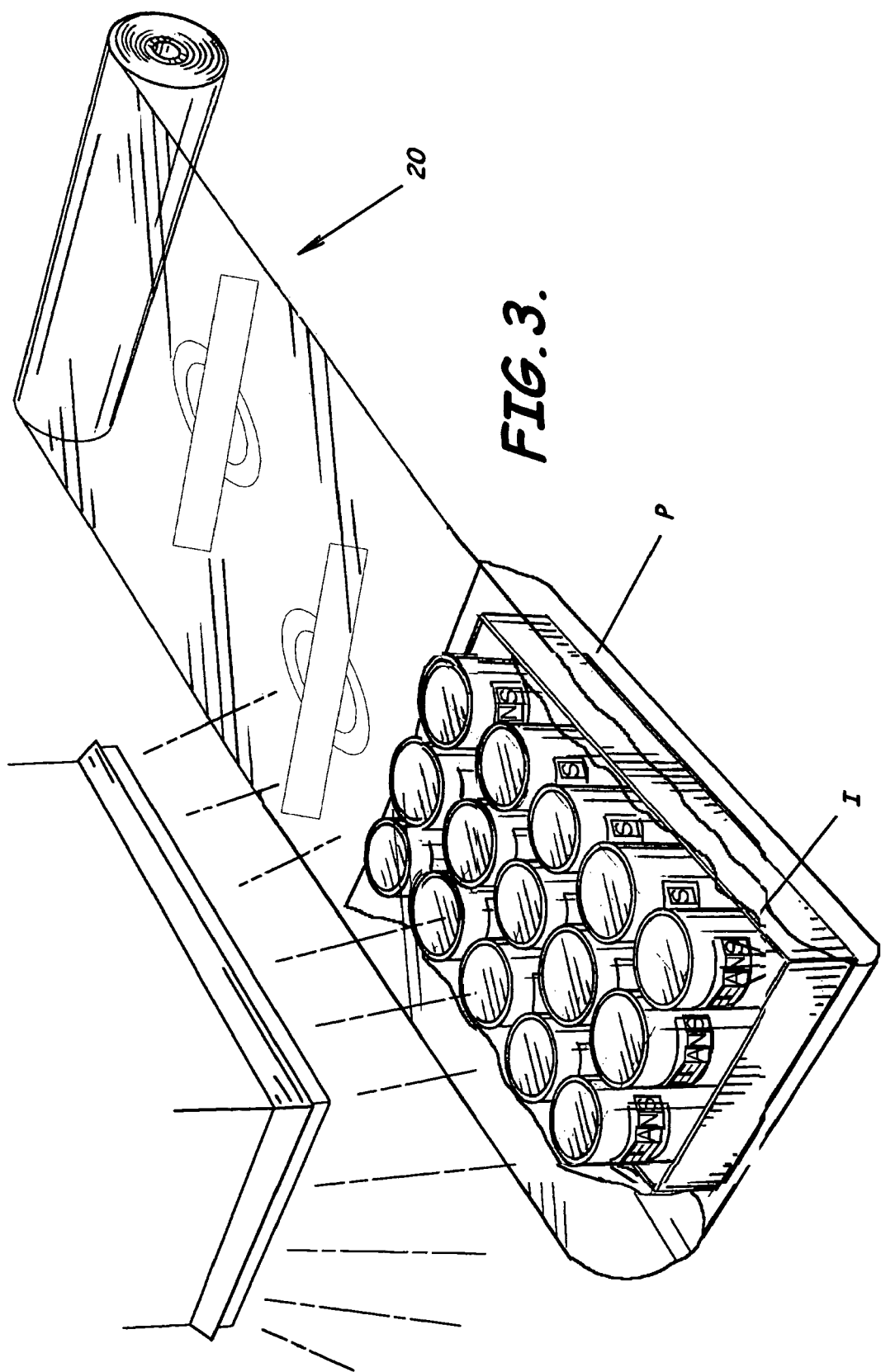
FIG. 3 is a perspective view of a packaging film being placed to substantially surround a product in accordance with an embodiment of the present invention.

The present invention now will be described more fully hereinafter with reference to the accompanying drawings in which illustrated embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout, and prime notation, if used, indicates similar elements in alternative embodiments.

As illustrated in FIGS. 1–3 and 4B, embodiments of the present invention advantageously provide a combination product P and packaging film 20 that has enhanced optical and mechanical properties. The enhanced optical and mechanical properties allow the product P and indicia I on the product P to be seen clearly through the packaging film 20 and also allow the packaging film 20 to resist from being punctured easily when an outside force is applied to the film 20. The combination preferably includes a product P and a shrink-wrap packaging film 20. The shrink-wrap packaging film 20 preferably contacts and substantially surrounds the product P and is shrunk thereon. As shown in FIG. 2, the shrink-wrap packaging film 20 preferably includes a first outermost layer of elastomer 21, a second inner layer of polyolefin 23, and a third outermost layer of elastomer 25. The second inner layer of polyolefin 23 preferably overlies and abuttingly contacts the first outermost layer of elastomer 21. Third outermost layer of elastomer 25 preferably overlies and abuttingly contacts the second inner layer of the polyolefin 23. Second inner layer of polyolefin 23 is preferably positioned between the first and the third outermost layers of elastomer 21, 25.

In embodiments of the present invention, the shrink-wrap packaging film 20 advantageously provides enhanced optical and mechanical properties for a selected overall packaging film gauge thickness. The enhanced optical and mechanical properties allow the product P to be seen more clearly through the packaging film 20 and increase modulus for the packaging film 20 that allow the packaging film 20 to be readily usable through packaging machinery, i.e., machinable, at relatively high speeds and provides packaging film having preselected optical and mechanical properties related to appearance, strength, and shrink properties.

Conventional packaging machinery can be used, as understood by those of ordinary skill in the art of packaging film manufacturing.

In all embodiments of the present invention, the packaging film 20 is sufficiently durable to be useful as a packaging film 20. The packaging film 20 can withstand forces being applied thereto, such as puncture sources, chime cuts, i.e. from products rubbing together, users lifting the combination product P and packaging film 20 by the packaging film 20, and the like.

Figure 4A:
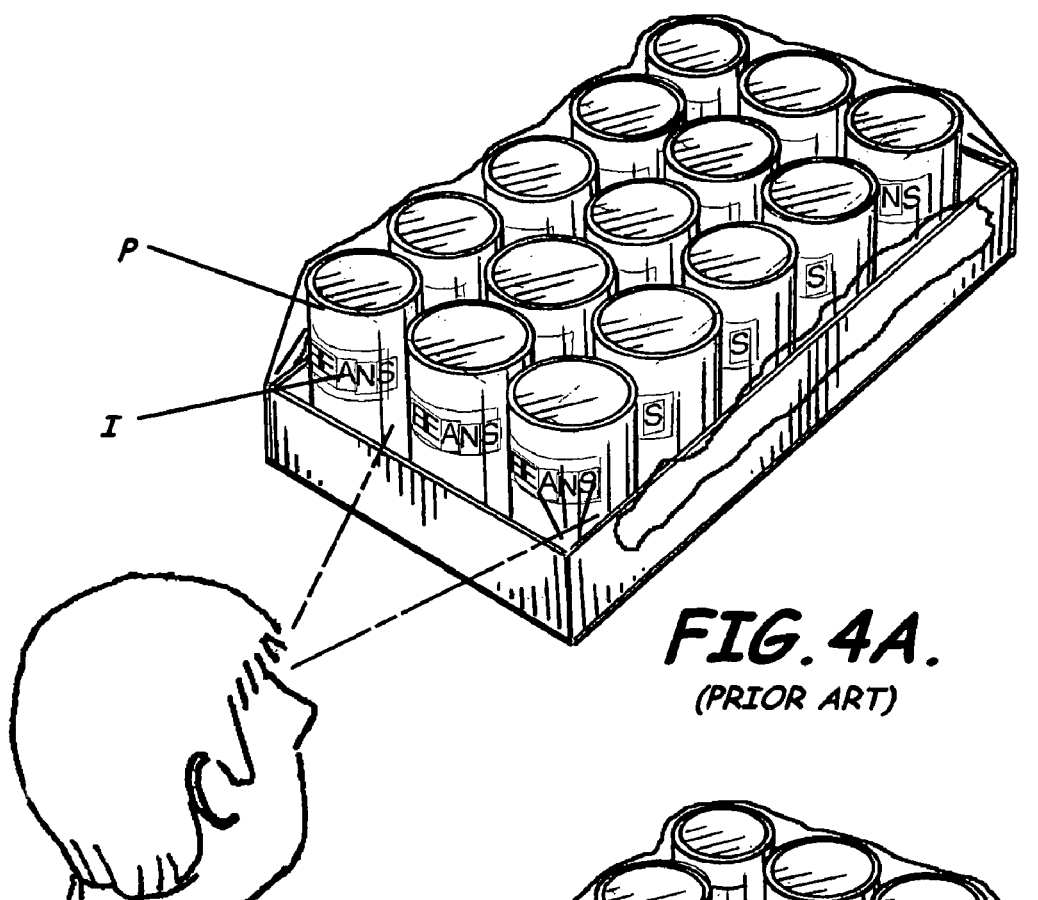
FIG. 4A is a perspective of a combination product and packaging film with the packaging film substantially surrounding the product so that the product is securely restrained by the packaging film in accordance with prior art packaging films.
Figure 4B:
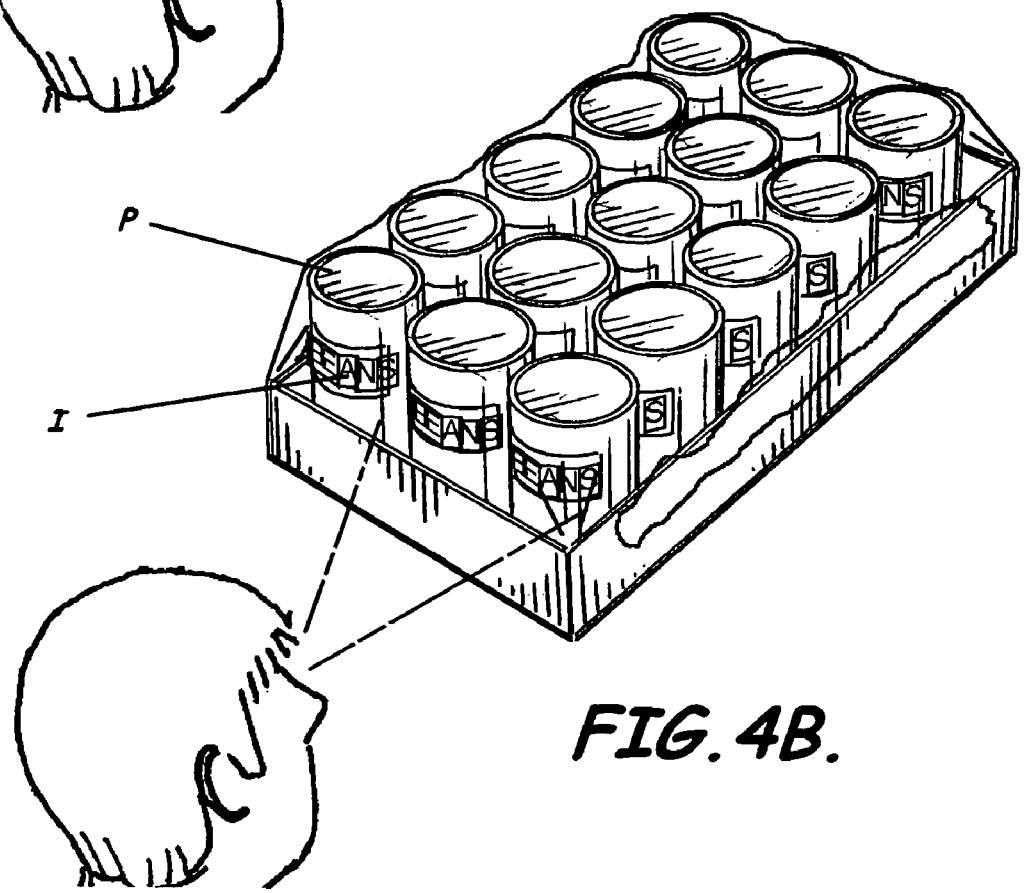
FIG. 4B is a perspective of a combination product and packaging film with the packaging film substantially surrounding the product so that the product is securely restrained by the packaging film, the packaging film having enhanced optical properties so that the product can be seen more clearly through the packaging film, in accordance with an embodiment of the present invention.

FIG. 4A illustrates a prior art packaging film with a product having shrink-wrap packaging film shrunk thereon. With the prior art film, the indicia I on the product P cannot be seen as easily through the film. In the present invention, the indicia I on the product P can be seen clearly through the packaging film 20, as shown in FIG. 4B, due to the enhanced optical properties of the present invention at a comparable film gauge thickness.

In all embodiments of the present invention, the elastomer preferably includes a styrene butadiene copolymer. Suitable butadiene styrene copolymers for use in the present invention include those commercially identified as the K-Resin® Series from Chevron Phillips Chemical Company LP of 10001 Six Pines Drive, The Woodlands, Tex. 77380. The butadiene styrene copolymer known commercially as DK 11 in the K-Resin® Series performed exceptionally well in initial tests. Another exemplary example butadiene styrene copolymer is known commercially as DK13, also in the K-Resin® Series. Other suitable elastomers can include polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, methyl methacrylate alkyl acrylate butadiene styrene copolymer, and the like. Elastomers having good optical characteristics, such as high clarity, are preferred. Other suitable elastomer materials will be known to those of ordinary skill in the art and are to be considered within the scope of the present invention.

In all embodiments of the present invention, the polyolefin preferably includes such polyolefins as polyethylene homopolymer, polypropylene homopolymer, ethylene/α-olefin copolymer, propylene/ethylene copolymer, or ethylene/unsaturated ester copolymer. A particularly effective polyolefin is a linear low density polyolefin. Other suitable polyolefin materials will be known to those of ordinary skill in the art and are to be considered within the scope of the present invention.

Although other thicknesses of film can be used as understood by those skilled in the art, the overall packaging film gauge thickness of packaging film 20 according to embodiments of the present invention preferably is in a range of about 0.5 to about 3 mil so that the packaging film 20 is more economical to manufacture without a reduction in clarity or strength of the packaging film 20.

In embodiments of the film 20 of the present invention, the first layer of elastomer is preferably in a range of about 10% to about 25% of the overall shrink-wrap packaging film gauge thickness X1, the second inner layer of polyolefin is preferably in a range of about 50% to about 80% of the overall shrink-wrap packaging film gauge thickness Y1, and the third outermost layer of elastomer is preferably in a range of about 10% to about 25% of the overall shrink-wrap packaging film gauge thickness X2, as shown in FIG. 2. The film 20 made in accordance with embodiments of the present invention has enhanced optical and mechanical properties that are particularly advantageous when used as a film 20 and, more specifically, as a shrink film 20. The optical and mechanical properties that are enhanced as a result of the present invention include haze, gloss, modulus, tensile strength, a measure of shrink, and a dart impact strength.

Figures 6A, 6B:
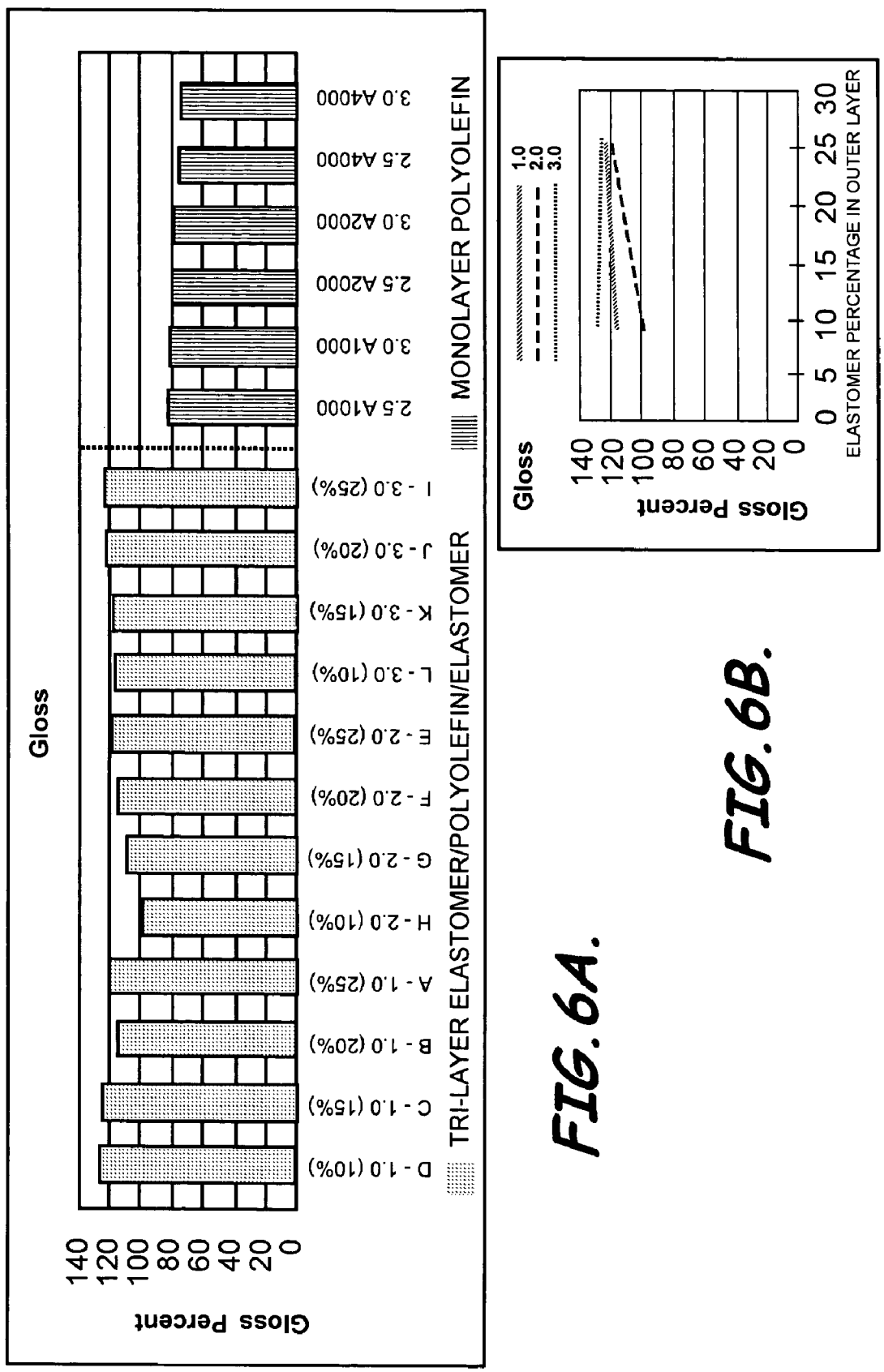
FIG. 6A is a bar graph illustrating the percentage of forty-five degree (45°) gloss for a plurality of tested film samples that were each formed in accordance with an embodiment of the present invention.
FIG. 6B is a graph illustrating the percentage of forty-five degree (45°) gloss for a plurality of tested film samples that were each formed in accordance with an embodiment of the present invention grouped according to the percentage of elastomer contained in a first outer layer of the packaging film.
Figures 7A, 7B:
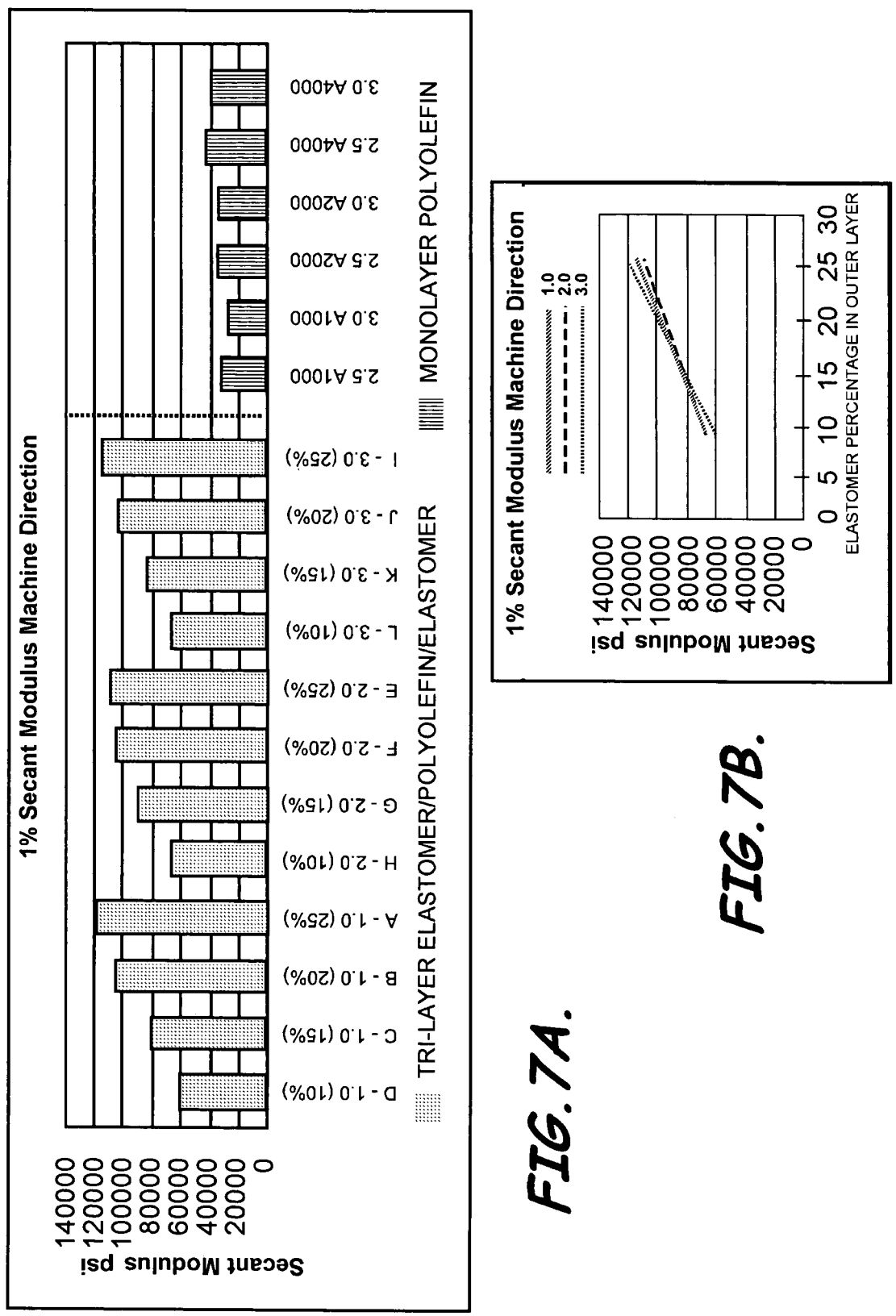
FIG. 7A is a graph illustrating the one percent (1%) secant modulus in a machine direction measured in pounds per square inch ("psi") for a plurality of tested film samples that were each formed in accordance with an embodiment of the present invention.
FIG. 7B is a graph illustrating the one percent (1%) secant modulus in a machine direction measured in pounds per square inch ("psi") for of a plurality of tested film samples that were each formed in accordance with an embodiment of the present invention grouped according to the percentage of elastomer contained in a first outer layer of the packaging film.
Figures 8A, 8B:
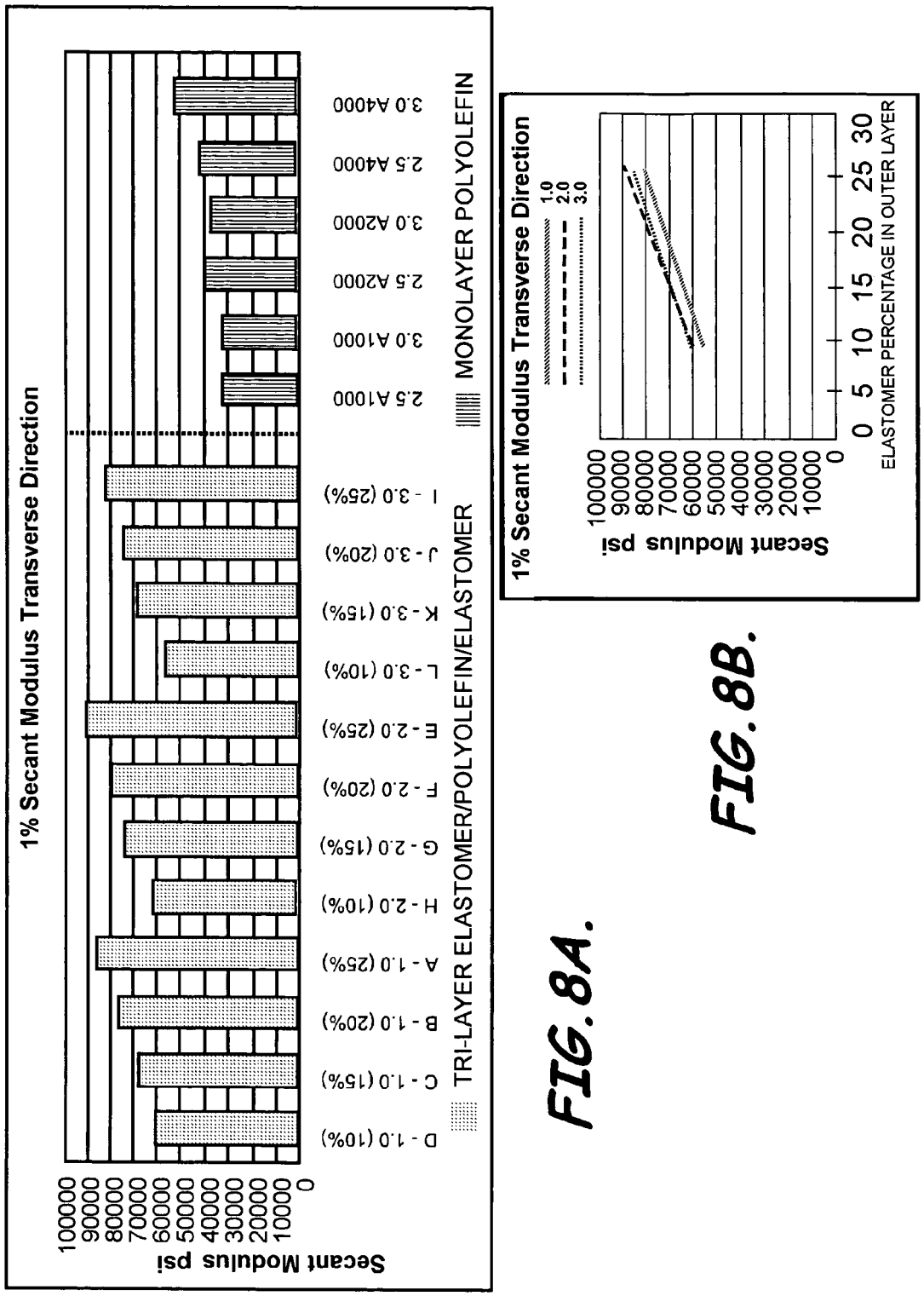
FIG. 8A is a graph illustrating the one percent (1%) secant modulus in a transverse direction measured in psi for a plurality of tested film samples that were each formed in accordance with an embodiment of the present invention.
FIG. 8B is a graph illustrating the one percent (1%) secant modulus in a transverse direction measured in psi for a plurality of tested film samples that were each formed in accordance with an embodiment of the present invention grouped according to the percentage of elastomer contained in a first outer layer of the packaging film.
Figures 10A, 10B:
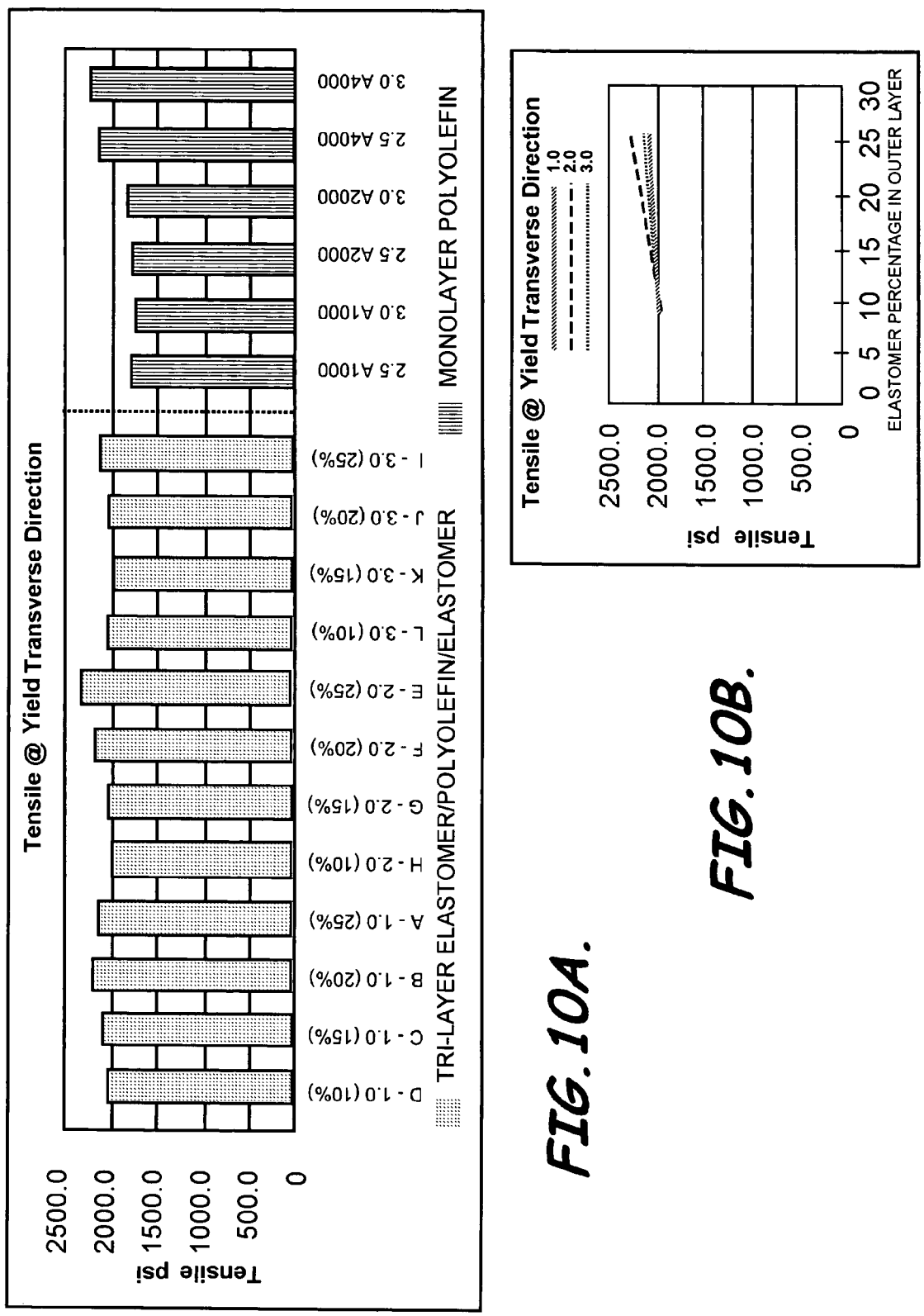
FIG. 10A is a graph illustrating the tensile at yield test results in a transverse direction measured in psi for a plurality of tested film samples that were each formed in accordance with an embodiment of the present invention.
FIG. 10B is a graph illustrating the tensile at yield test results in a transverse direction measured in psi for a plurality of tested film samples that were each formed in accordance with an embodiment of the present invention grouped according to the percentage of elastomer contained in a first outer layer of the packaging film.
Figures 11A, 11B:
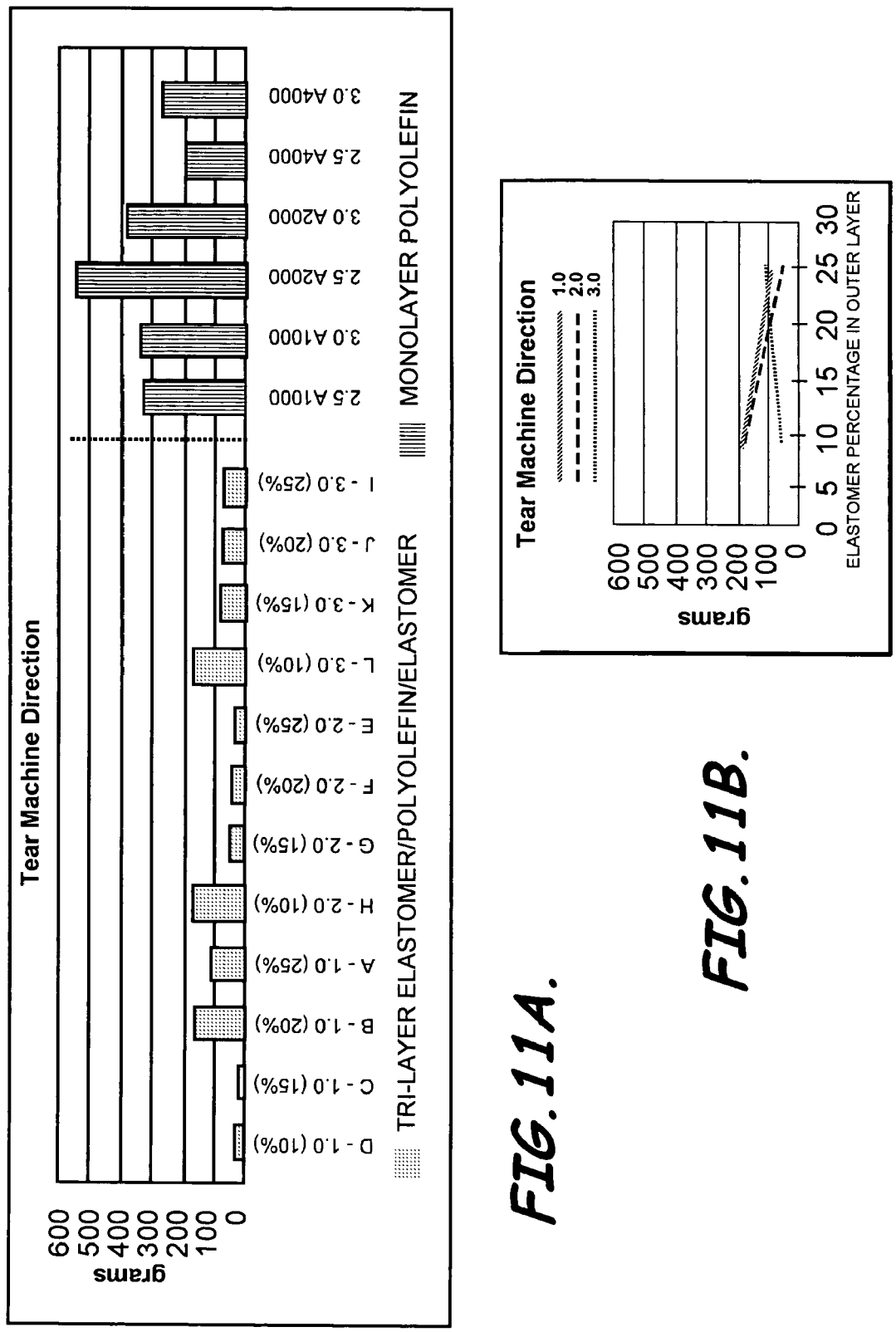
FIG. 11A is a graph illustrating the tear test results in a machine direction measured in psi for a plurality of tested film samples that were each formed in accordance with an embodiment of the present invention.
FIG. 11B is a graph illustrating the tear test results in a machine direction measured in psi for a plurality of tested film samples that were each formed in accordance with an embodiment of the present invention grouped according to the percentage of elastomer contained in a first outer layer of the packaging film.
Figures 12A, 12B:
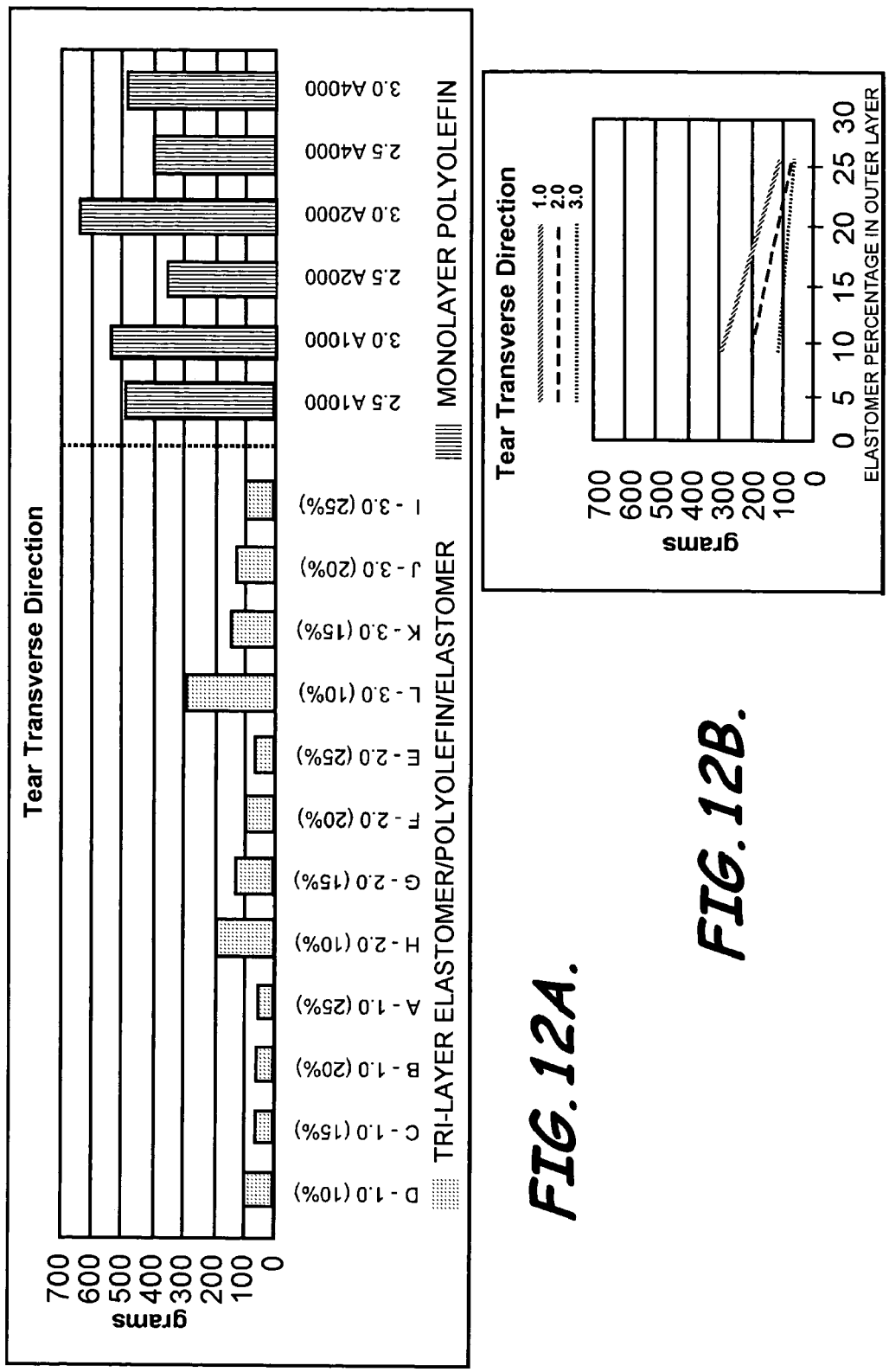
FIG. 12A is a graph illustrating the tear test results in a transverse direction measured in psi for a plurality of tested film samples that were each tested in accordance with an embodiment of the present invention.
FIG. 12B is a graph illustrating the tear test results in a transverse direction measured in psi for a plurality of tested film samples that were each tested in accordance with an embodiment of the present invention grouped according to the percentage of elastomer contained in a first outer layer of the packaging film.

In embodiments of the film 20 of the present invention, the film 20 preferably has a haze, which is one of the enhanced optical properties, in a range of about 1% to about 10%, as shown in FIGS. 5A and 5B. The lower the haze, the better for a packaging film 20. Haze is a measurement of the cloudiness of the film 20. A haze value in a range of about 1% to about 10% indicates that the packaging film 20 is clear and the product P, which is substantially surrounded by the packaging film 20 when shrunk thereon, optionally having indicia I thereon can be seen easily through the packaging film 20. As shown in FIGS. 6A and 6B, the enhanced optical properties can also include a 45° gloss in a range of about 70% to about 110%, and more preferably in a range of about 70% to about 110%, so that the packaging film 20 is shiny and the product P can be seen easily through packaging film 20 once the packaging film 20 is heated to securely restrain the product P within packaging film 20. Gloss is important for packaging film 20 since the packaging has a more appealing look and presence when displayed upon a shelf. Packaging with shiny surfaces is generally more desirable to consumers than packaging having dull surfaces.

In all embodiments of the present invention, packaging film 20 can include indicia I on the packaging film 20. This indicia I can make the combination product P and shrink-wrap packaging film 20 more aesthetically pleasing to consumers.

As shown in FIGS. 9A, 9B, 10A, and 10B, enhanced mechanical properties of the film 20 can include a tensile strength in a range of about 2000 psi to about 3500 psi so that the packaging film 20 is not easily punctured once shrunk onto a product P to securely restrain the product P within the packaging film 20. As illustrated in FIGS. 7A, 7B, 8A, and 8B, the enhanced mechanical properties also can include a tensile modulus in a range of about 50,000 psi to about 120,000 psi so that the packaging film 20 is sufficiently durable once heated to securely restrain the product P within the packaging film 20. The increased tensile modulus advantageously enables packaging film 20 to be processed through packaging machinery at relatively high speeds. The enhanced mechanical properties further can include a measurement of shrink in a transverse direction in a range of about 0% to about 60% and in a machine direction in a range of about 60% to about 90% so that the packaging film 20 shrinks sufficiently to securely restrain the product P within the packaging film 20. Films having low transverse direction shrink perform exceptionally well in "bulls eye" shrink-wrap packaging applications, as understood by those of ordinary skill in the art of shrink wrap films.

Figure 13A:
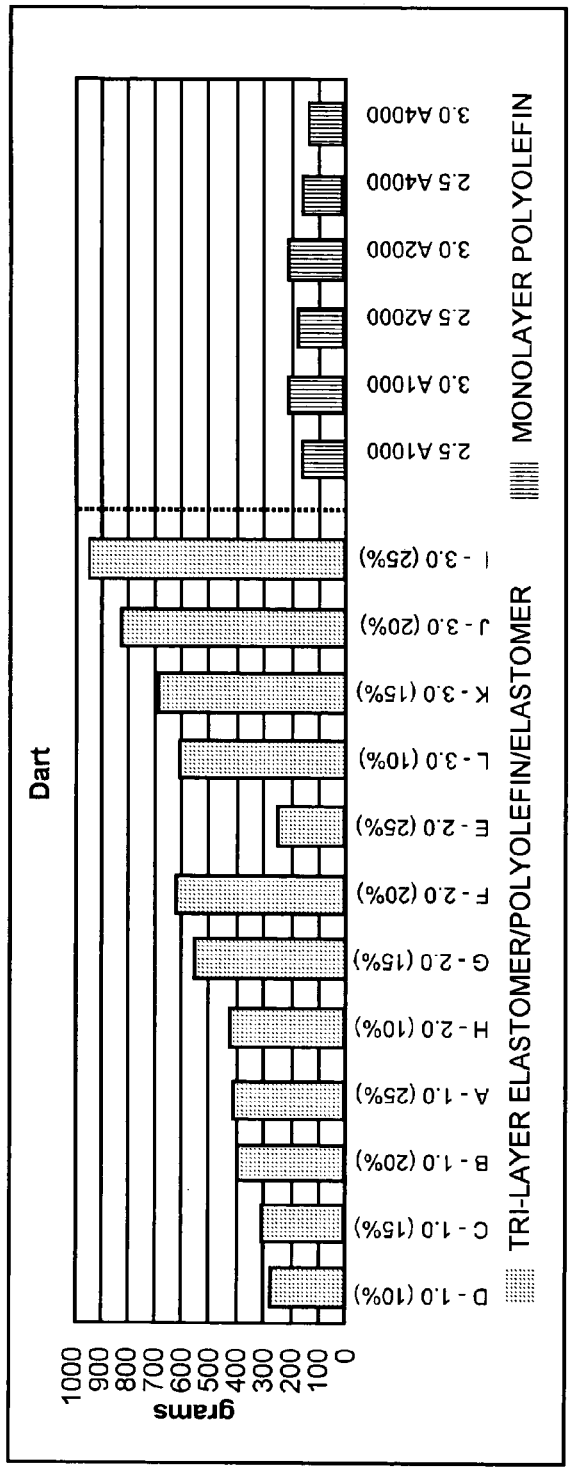
FIG. 13A is a graph illustrating the dart impact test results measured in grams for a plurality of tested film samples that were each formed in accordance with an embodiment of the present invention.
Figure 13B:
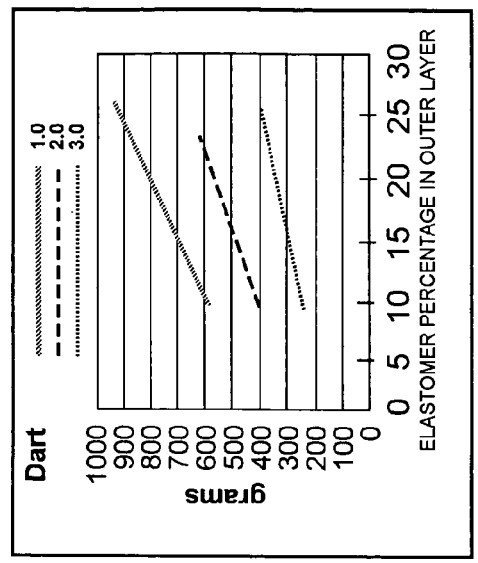
FIG. 13B is a graph illustrating the dart impact test results measured in grams for a plurality of tested film samples that were each formed in accordance with an embodiment of the present invention grouped according to the percentage of elastomer contained in a first outer layer of the packaging film.

Another mechanical property that is measured for embodiments of packaging films 20 of the present invention is the dart impact strength. The dart impact strength in all embodiments of the present invention is preferably in a range of about 300 grams to about 1000 grams so that the packaging film 20 will not puncture easily when an outside force is applied thereto, as shown in FIGS. 13A and 13B. A dart impact test, which has been standardized in ASTM D 3763, for example, measures the amount of energy necessary for a high-speed, round-tipped dart to puncture a 3.2 mm thick film 20. This test is an important indicator of impact strength for films 20.

In an embodiment of the present invention, the present invention also advantageously provides a packaging film 20 having enhanced optical and mechanical properties. The enhanced optical and mechanical properties enable a product P surrounded by packaging film 20 to be seen more clearly through packaging film 20, without the need to remove packaging film 20. The enhanced properties also prevent the packaging film 20 from being punctured easily when an outside force is applied thereto. Packaging film 20 preferably includes a first layer of a sheet of elastomer 21, a second layer of polyolefin 23, and a third layer of a sheet of elastomer 25. The second sheet of polyolefin 23 advantageously has a first surface abuttingly contacting a first surface of the first layer of the sheet of elastomer 21. The third layer of the sheet of elastomer 25 abuttingly contacts a second surface of the second layer of polyolefin 23 so that the second layer of polyolefin 23 is preferably positioned between the first and third layers of elastomer 21, 25. Packaging film 20 preferably has a 45° gloss in a range of about 70% to about 110%.

Several methods of forming the packaging film 20 with enhanced optical and mechanical properties also are provided according to the present invention. The packaging film 20 of the present invention can be manufactured using typical bubble blown film processes and machines 30 and cast film processes and machines 30' without having to modify the machine or equipment, as can be seen in FIGS. 14 and 15.

Figure 14:
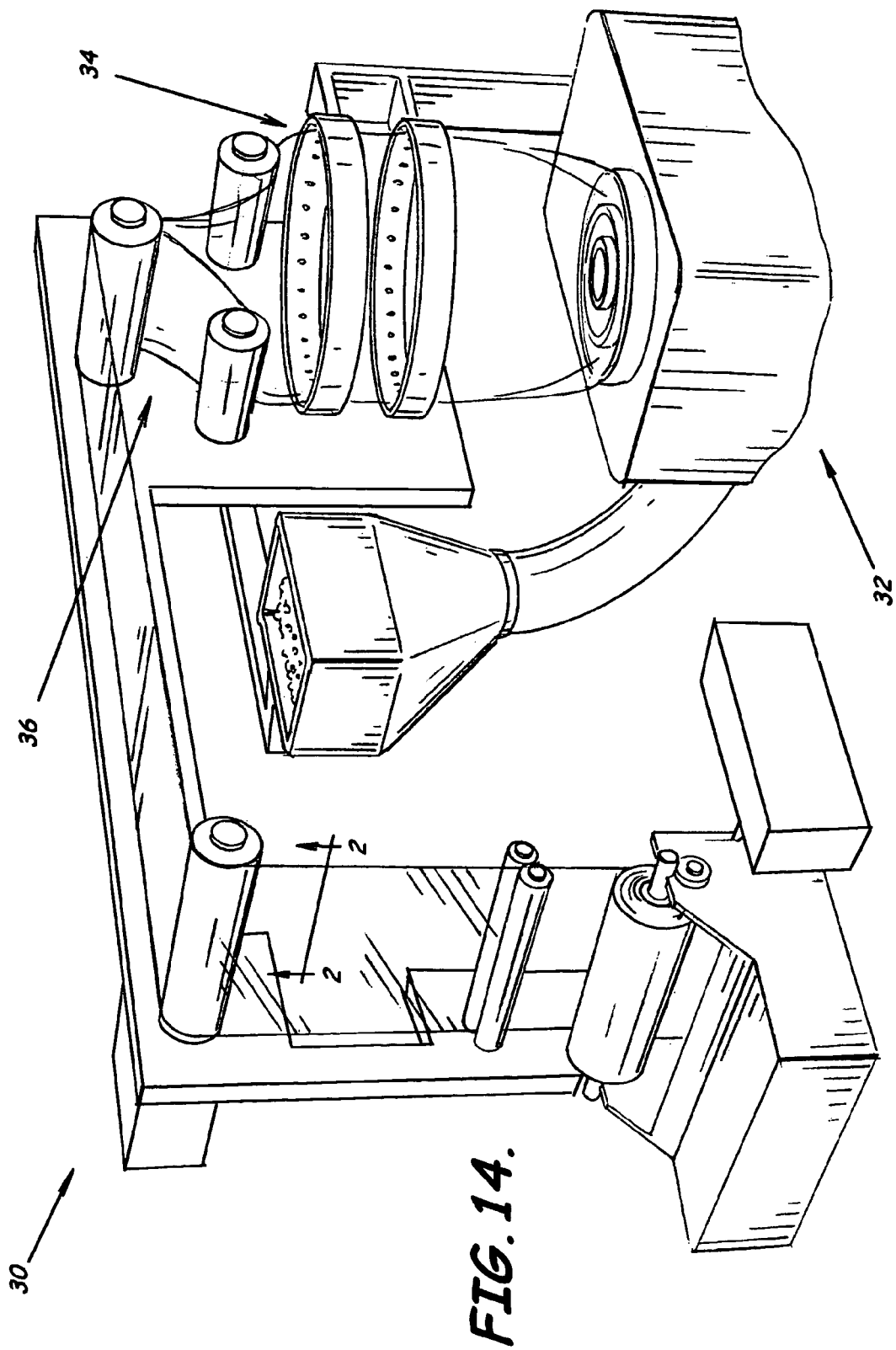
FIG. 14 is a perspective view of an example of a blown film apparatus and process used to manufacture a packaging film in accordance with an embodiment of the present invention.
Figure 15:
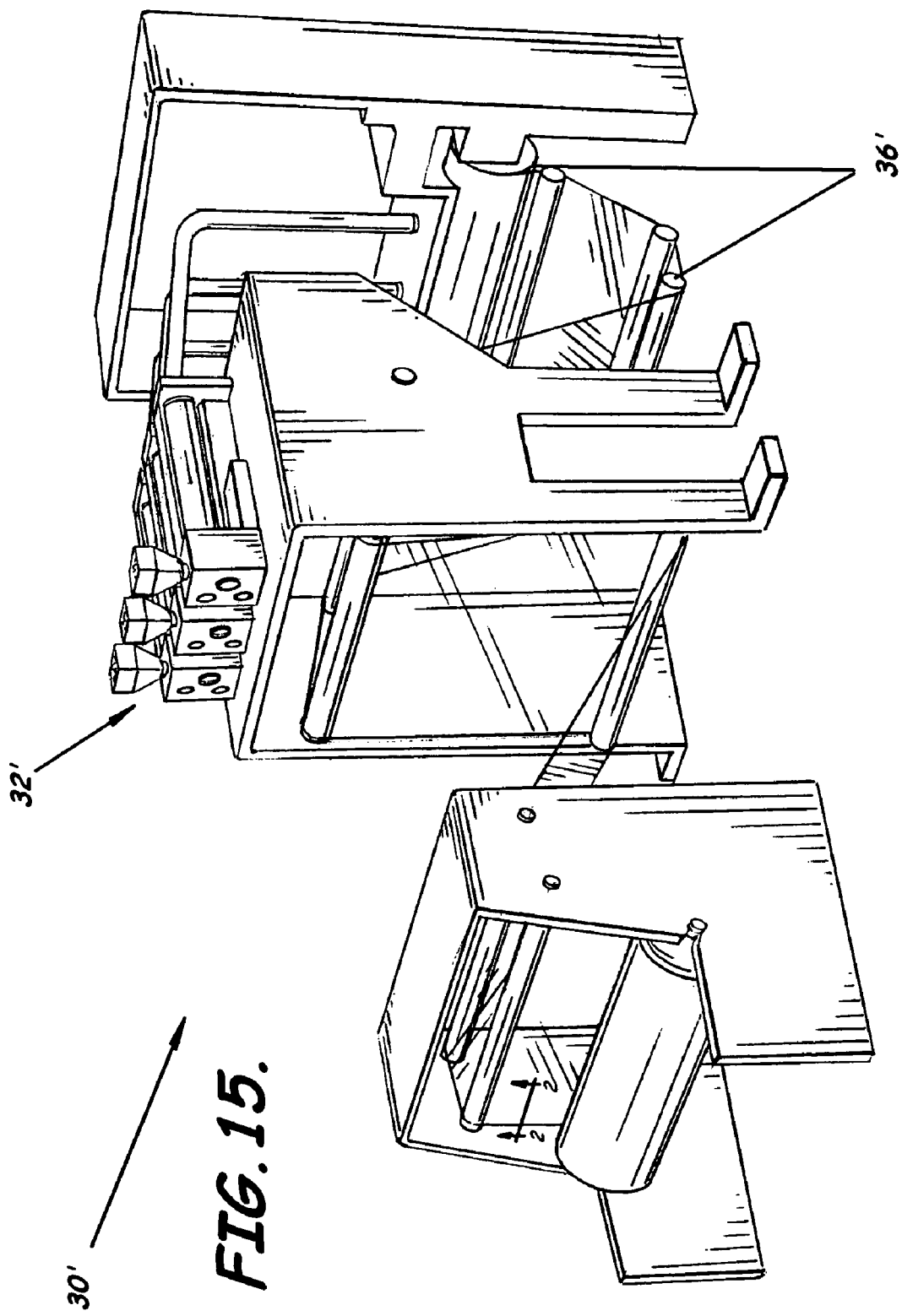
FIG. 15 is perspective view of an example of a cast film apparatus and process used to manufacture a packaging film in accordance with an embodiment of the present invention.

In one embodiment illustrated in FIG. 14, the method of forming a packaging film 20 having enhanced optical and mechanical properties advantageously includes positioning a first extruded layer of elastomer 21, a second extruded layer of polyolefin 23, and a third extruded layer of elastomer 25 so that the first and third extruded layers of elastomer 21, 25 are the outermost layers of packaging film 20. The extruder 32 used to form the layers for use in packaging film 20 can be a series of individual extruders 32 for each material to form a separate layer having its own extruder 32. Alternatively, a coextruder 32 that can extrude two or more materials through a single die with two or more orifices arranged so that the extruded materials merge into a laminar structure can also be used. The elastomer and polyolefin materials are melted in the extruder 32 to produce a molten material, each of which is then forced through a die to produce a layered laminar structure. The layered laminar structure is then formed into packaging film 20 by conventional blown film processes, as understood by those of ordinary skill in the art of packaging film manufacturing. For example, the layered laminar structure can be stretched and exposed to air that is supplied to the layered laminar structure to produce a bubble 34. The bubble 34 is then collapsed, typically by rollers 36, to form a packaging film 20, as understood by those of ordinary skill in the art. The packaging film 20 preferably has an inner second layer of polyolefin 23 positioned between first and third outermost layers of elastomer 21, 25. The packaging film 20 advantageously has enhanced optical and mechanical properties for a selected overall packaging film gauge thickness that allow a product P surrounded by packaging film 20 to be seen more clearly through packaging film 20 without having to remove packaging film 20. The enhanced optical and mechanical properties also increase modulus for packaging film 20 so that packaging film 20 is readily usable with packaging machinery, i.e., machinable, at relatively high speeds. The elastomer is preferably a styrene butadiene copolymer or any other suitable elastomer, as described herein, and the polyolefin is selected from the group consisting of polyethylene and polypropylene or any other suitable polyolefin, as described herein.

It is understood that in the blown film manufacturing process, as shown in FIG. 14, the step of collapsing the bubble 34 can be performed in various manners. Bubble 34 can be collapsed quickly, which allows the inner layers of the bubble 34 to fuse together, effectually making a flat sheet. If this technique is used with the packaging film 20 of the present invention, then a five layer packaging film 20 would be manufactured with the structure being a layer of elastomer/a layer of polyolefin/a layer of elastomer/a layer of polyolefin/a layer of elastomer. Alternatively, the bubble 34 could be sufficiently quenched into a solid form prior to collapsing the bubble. If this method is used, essentially a flattened tube in formed in which the inside surfaces of the flattened tube will not adhere to one another. Both of the methods of collapsing the bubble 34 in the blown film processes are considered within the scope of the present invention, along with the resulting five layer packaging film embodiments and the flattened tube material.

If a flattened tube material is formed, the flattened tube material can then be converted to a roll stock of packaging film for sale to consumers, as shown in FIG. 1, by three methods. The first method is to roll up the flattened tube material on a winder resulting in a tubular roll that can then be sold. This method is typically used for some form-fill-seal machines that form bags by placing a horizontal seal on the tube to form a bottom of the bag, filling the tube with product P, and then placing another horizontal seal across the top of the tube to form a top of the bag that is sealed. The second method of converting the flattened tube material to a roll stock is to cut the flattened tube material with a single slitting blade at one location on the web, which makes what is known as V sheeting. V sheeting can be used by end users to insert products, such as compact discs, between the sheets and heat seal both ends and the side of the sheets that has been cut open. The third method of converting the flattened tube material to a roll stock is to cut the flattened tube material with slitting blades at both ends, and optionally between the ends, to form what is known as sheeting, or single wound rolls. Packaging film sheeting is then formed by the end users on their own machinery to enclose the product within the packaging film sheeting. The methods for converting the flattened tube material to roll stock are also considered within the scope of the present invention.

The overall packaging film gauge thickness preferably is in a range of about 0.5 to about 3 mil, and the method can further include the step of printing indicia I on the packaging film 20 after the packaging film 20 has been formed, as shown in FIG. 3. As understood by those skilled in the art, when indicia I is printed on the packaging film 20 of the present invention, the indicia I is reverse printed on a surface of the packaging film 20 that contacts the product P so that the indicia I can be seen clearly through the packaging film 20. The indicia I is located on a surface of the packaging film 20 that contacts the product P when the packaging film 20 is shrunk thereon. The packaging film 20 functions as a physical protective coating for the indicia I. Chemical coatings that are typically used in printing processes to protect the indicia I are not required.

Another embodiment of a method of forming a packaging film 20 having enhanced optical and mechanical properties 30' so that for a selected overall packaging film gauge thickness, as shown in FIG. 15. In this embodiment, the method preferably includes the step of positioning a first extruded layer of elastomer 21, a second extruded layer of polyolefin 23, and a third extruded layer of elastomer 25 to form packaging film 20. To produce the extruded layers, in the extruder 32', the elastomer and polyolefin are melted to produce a molten material, which is then forced through a die to produce a layered laminar structure. As previously indicated, a coextruder with a single die with two or more orifices can also be used. The layered laminar structure is then formed into packaging film 20 by conventional cast film processes, as shown in FIG. 15 and as understood by those of ordinary skill in the art of packaging film manufacturing. For example, the extruded layers can be rolled with rollers 36' to form a packaging film 20, as shown in FIG. 15. In the layered laminar structure of the packaging film 20, the second layer preferably is polyolefin 23 positioned between first and third layers of elastomer 21, 25. The packaging film 20 advantageously has enhanced optical and mechanical properties for a selected overall packaging film gauge thickness. For example, a thinner film 20 can be produced that still enables users to clearly see the product P through the packaging film 20 and that resists puncturing when an outside force is applied thereto.

The elastomer provided is preferably a styrene butadiene copolymer and the polyolefin is preferably selected from the group consisting of polyethylene and polypropylene. Other suitable elastomers and polyolefins are described herein and can also be used in the embodiments of forming a packaging film 20 in accordance with the present invention. The overall packaging film gauge thickness preferably is in a range of about 0.5 to about 3 mil, and the method further includes the step of printing indicia I on the packaging film 20 after the packaging film 20 has been formed, as indicated herein.

The film 20 produced in accordance with the present invention advantageously can be produced with a lower gauge, which allows manufacturers to use less material when manufacturing the film 20, thereby lowering manufacturing costs. Films 20 typically have a gauge of about 2 to about 3.5 mil thick. The film 20 of the present invention advantageously has a film gauge thickness is in a range of about 0.5 to about 3 mil. A mil is defined herein as a measurement of thickness. One mil is one thousandth of an inch. For example, a 0.80 stretch wrap is 0.8 thousandths of an inch thick. 80 gauge is the equivalent as 0.80 mil. 80 gauge or 0.80 mil thick stretch wrap is performs well for many applications requiring packaging film 20.

To form the combination product P and film 20 embodiments of the present invention, the film 20 is first stretched out. During this stretched out orientation, the molecules with the elastomers and polyolefins are locked, or frozen, into their elongated state. A product P is then placed on the film 20 and the film 20 is then essentially wrapped around the product P. When heat is applied to the film 20 with the product P placed within the film 20, excess energy increases molecular motion within the chemical compounds that form the layers of the film 20. The elongated chemical molecules recoil, or shrink, back to their preferred random and disordered orientation. The result is a product P with the shrink-wrap packaging film 20 shrunk thereon. The film 20 securely restrains the product P within the film 20.

Tests were performed on twelve different samples of packaging film 20 manufactured in accordance with the present invention. Descriptions of the twelve samples can be found in Table 1 herein below. For the elastomer, a butadiene styrene copolymer known commercially as DK11 in the K-Resin® Series manufactured by Chevron Phillips Chemical Company was used in the test. A 3% antiblock additive was used in the elastomer layers to prevent the outer layers from sticking together once the finish packaging film 20 was made and formed into rolls. For the polyolefin, a low-density polyethylene was used. The layer percentages relate to the thickness of each layer used in the total film gauge thickness. For example, Sample A was a 1.0 mil thick packaging film 20 that was created with a 0.25 mil thick layer of butadiene styrene copolymer, a 0.50 mil thick layer of polyolefin, and a 0.25 mil thick layer of butadiene styrene copolymer. The test results are shown in the graphs shown in FIGS. 5A–13B. The sample designations listed in Table 1 correspond to the samples listed on the X-axis of the graphs in FIGS. 5A–13B.

TABLE 1

| Total Film gauge thickness | SAMPLE DESCRIPTIONS | | | |
|---|---|---|---|---|
| | Layer Percentages | | | |
| (mils) | 25/50/25 | 20/60/20 | 15/70/15 | 10/80/10 |
| 1.0 | A | B | C | D |
| 2.0 | E | F | G | H |
| 3.0 | I | J | K | L |

Depending upon the desired characteristics of the packaging film 20 in accordance with an embodiment of the present invention, the optical and mechanical properties can be customized by increasing the amount of elastomer or polyolefin within the packaging film 20. For example, mechanical properties related to strength, such as tensile at yield, modulus, and ultimate tensile are generally higher for the packaging films 20 containing a higher amount of the elastomer and lower for those containing a higher amount of polyolefin, as shown in FIGS. 7A, 7B, 8A, 8B, 9A, 9B, 10A, 10B, 13A, and 13B. Similarly, optical properties, such as haze and gloss, are generally higher for the packaging films 20 containing a higher amount of the elastomer and lower for those containing a higher amount of polyolefin, as shown in FIGS. 5A, 5B, 6A, and 6B. Conversely, tear resistance is higher for structures containing higher amounts of polyolefin and lower for structures containing higher amounts of elastomer, as shown in FIGS. 11A, 11B, 12A, and 12B. The ability to change the amount of elastomer or polyolefin allows the packaging film 20 to be manufactured, or customized, to enhance specific characteristics related to the packaging film 20.

As an advantage of the present invention, the shrink-wrap or other packaging films 20 made in accordance with the present invention are more economical to manufacture. The use of the elastomer in the film improves the physical properties of the film 20, so that a thinner packaging film 20 can be made. The performance properties of the packaging film 20 remains the same or are increased with a thinner gauged film 20. Because less material is needed to manufacture the film 20 and conventional equipment can be used, manufacturing costs are lowered.

As another advantage of the present invention, the films 20 provide evidence of tampering if someone attempts to remove the film 20 that has been heat sealed to a product P. The clarity of the film 20 allows users to easily determine if tampering has occurred.

In the drawings and specification, there have been disclosed various illustrated embodiments of the invention and, although specific terms are employed, they are used in a generic and descriptive sense only and not for the purpose of limitation, the scope of the invention being set forth in the following claims.

The invention claimed is:

1. A combination product and shrink-wrap packaging film having enhanced optical and mechanical properties so that the product can be seen more clearly through the packaging film and the packaging film is not punctured easily when an outside force is applied thereto, the combination comprising:
   a product; and
   a shrink-wrap packaging film having a selected overall packaging film gauge thickness and contacting and substantially surrounding the product and shrunk thereon, the packaging film comprising a first outermost layer of elastomer in a range of about 10% to about 25% of the overall packaging film gauge thickness, a second inner layer of polyolefin in a range of about 50% to about 80% of the overall packaging film gauge thickness and overlying and abuttingly contacting the first outermost layer of elastomer, and a third outermost layer of elastomer in a range of about 10% to about 25% of the overall packaging film gauge thickness and overlying and abuttingly contacting the second inner layer of the polyolefin so that the second inner layer of polyolefin is positioned between the first and the third outermost layers of elastomer, the shrink-wrap packaging film having enhanced optical and mechanical properties for the overall packaging film gauge thickness to allow the product to be seen more clearly through the packaging film and to increase modulus for the packaging film, the enhanced mechanical properties comprising a measurement of shrink in a transverse direction in a range of about 0% to about 60% and in a machine direction in a range of about 60% to about 90%, a tensile modulus in a range of about 50,000 psi to about 120,000 psi, and a tensile strength in a range of about 2000 psi to about 3500 psi, the enhanced optical properties comprising a haze in a range of about 1% to about 10% so that the packaging film is clear and the product can be seen easily through the shrink-wrap packaging film once the packaging film is heated to securely restrain the product with the shrink-wrap packaging film.

2. A combination product and shrink-wrap packaging film according to claim 1, wherein the elastomer comprises a styrene butadiene copolymer, the polyolefin is selected from the group consisting of polyethylene and polypropylene, and the increase in modulus allows the packaging film to be readily usable with packaging machinery at relatively high speeds and provides packaging film having preselected optical and mechanical properties.

3. A combination product and shrink-wrap packaging film according to claim 1, wherein the elastomer comprises at least one of the following compounds: polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, and methyl methacrylate alkyl acrylate butadiene styrene copolymer.

4. A combination product and shrink-wrap packaging film according to claim 1, wherein the polyolefin comprises at least one of the following compounds: polyethylene homopolymer, polypropylene homopolymer, propylene/ethylene copolymer, and ethylene/unsaturated ester copolymer.

5. A combination product and shrink-wrap packaging film according to claim 1, wherein the overall shrink-wrap packaging film gauge thickness is in a range of about 0.5 to about 3 mil so that the shrink-wrap packaging film is more economical to manufacture without a reduction in clarity or strength of the shrink-wrap packaging film.

6. A combination product and shrink-wrap packaging film according to claim 1, wherein the overall shrink-wrap packaging film gauge thickness is in a range of more than one mil to about three mils so that the shrink-wrap packaging film is more economical to manufacture without a reduction in clarity or strength of the shrink-wrap packaging film.

7. A combination product and shrink-wrap packaging film according to claim 1, wherein the product comprises a plurality of individual items each positioned laterally adjacent at least two other of the plurality of items, the combination further including indicia on at least one of the plurality of items so that the indicia can be seen more clearly through the shrink-wrap packaging film without the necessity of removing the shrink-wrap packaging film.

8. A combination product and shrink-wrap packaging film according to claim 1, wherein the enhanced optical properties comprise a 45° gloss in a range of about 70% to about 110% so that the shrink-wrap packaging film is shiny and the product can be seen easily through the shrink-wrap packaging film once the shrink-wrap packaging film is heated to securely restrain the product within the shrink-wrap packaging film.

9. A combination product and shrink-wrap packaging film according to claim 8, further including indicia on the shrink-wrap packaging film so that the combination product and shrink-wrap packaging are more aesthetically pleasing to consumers.

10. A combination product and shrink-wrap packaging film according to claim 1, wherein the measurement of shrink in the transverse direction is further in a range of 10% to about 60% so that the shrink-wrap packaging film shrinks sufficiently to securely restrain the product within the shrink-wrap packaging film.

11. A combination product and shrink-wrap packaging film according to claim 10, wherein the enhanced mechanical properties comprise a dart impact strength in a range of about 300 grams to about 1000 grams so that the shrink-wrap packaging film is not punctured easily when an outside force is applied thereto.

12. A packaging film having enhanced optical and mechanical properties so that a product surrounded by the packaging film can be seen more clearly through the packaging film and the packaging film is not punctured easily when an outside force is applied thereto, the packaging film comprising:
   a first layer of a sheet of elastomer in a range of about 10% to about 25% of an overall packaging film gauge thickness;
   a second layer of polyolefin in a range of about 50% to about 80% of the overall packaging film gauge thickness and having a first surface abuttingly contacting a first surface of the first layer of the sheet of elastomer; and a third layer of a sheet of elastomer in a range of about 10% to about 25% of the overall packaging film gauge thickness and abuttingly contacting a second surface of the second layer of polyolefin so that the second layer of polyolefin is positioned between the first and third layers of elastomer, the packaging film having enhanced optical and mechanical properties for the selected overall packaging film gauge thickness, the enhanced mechanical properties comprising a measurement of shrink in a transverse direction in a range of about 0% to about 60% and in a machine direction in a range of about 60% to about 90%, a tensile modulus in a range of about 50,000 psi to about 120,000 psi, and a tensile strength in a range of about 2000 psi to about 3500 psi, the enhanced optical properties comprising a haze in a range of about 1% to about 10% so that the packaging film is clear and so that a product surrounded by the packaging film can be seen more clearly through the packaging film.

13. A packaging film according to claim 12, wherein the packaging film that is readily usable with packaging machinery at relatively high speeds and provides packaging film having preselected optical and mechanical properties.

14. A packaging film according to claim 12, wherein the polyolefin is selected from the group consisting of polyethylene and polypropylene and the elastomer comprises a styrene butadiene copolymer.

15. A packaging film according to claim 12, wherein the elastomer comprises at least one of the following compounds: polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, and methyl methacrylate alkyl acrylate butadiene styrene copolymer.

16. A packaging film according to claim 12, wherein the polyolefin comprises at least one of the following compounds: polyethylene homopolymer, polypropylene homopolymer, propylene/ethylene copolymer, and ethylene/unsaturated ester copolymer.

17. A packaging film according to claim 12, wherein the overall packaging film gauge thickness is in a range of about 0.5 to about 3 mil.

18. A packaging film according to claim 17, wherein the enhanced optical properties comprise a haze in a range of about 1% to about 10% and a 45° gloss in a range of about 70% to about 110%.

19. A packaging film according to claim 12, wherein the overall packaging film gauge thickness is in a range of more than one mil to about three mils.

20. A packaging film according to claim 12, wherein the measurement of shrink in the transverse direction is further in a range of 10% to about 60%.

21. A packaging film according to claim 12, wherein the enhanced mechanical properties comprise a dart impact strength in a range of about 300 grams to about 1000 grams.

22. A packaging film comprising a first layer of a sheet of elastomer in a range of about 10% to about 25% of an overall packaging film gauge thickness, a second layer of polyolefin in a range of about 50% to about 80% of the overall packaging film gauge thickness and having a first surface abuttingly contacting a first surface of the first layer of the sheet of elastomer, and a third layer of a sheet of elastomer in a range of about 10% to about 25% of the overall packaging film gauge thickness and abuttingly contacting a second surface of the second layer of polyolefin so that the second layer of polyolefin is positioned between the first and third layers of elastomer, the packaging film having enhanced mechanical and optical properties, the enhanced mechanical properties comprising a measurement of shrink in a transverse direction in a range of about 0% to about 60% and in a machine direction in a range of about 60% to about 90%, a tensile modulus in a range of about 50,000 psi to about 120,000 psi, and a tensile strength in a range of about 2000 psi to about 3500 psi, the enhanced optical properties comprising a 45° gloss in a range of about 70% to about 110% and a haze in a range of about 1% to about 10% so that the packaging film is clear and a product can be seen easily through the packaging film.

23. A packaging film having enhanced optical and mechanical properties, the packaging film comprising:

a first layer of a sheet of elastomer in a range of about 10% to about 25% of an overall packaging film gauge thickness;

a second layer of polyolefin in a range of about 50% to about 80% of the overall packaging film gauge thickness and having a first surface abuttingly contacting a first surface of the first layer of the sheet of elastomer; and a third layer of a sheet of elastomer in a range of about 10% to about 25% of the overall packaging film gauge thickness and abuttingly contacting a second surface of the second layer of polyolefin so that the second layer of polyolefin is positioned between the first and third layers of elastomer, the packaging film also having a measurement of shrink in a transverse direction in a range of about 0% to about 60% and in a machine direction in a range of about 60% to about 90%, a tensile modulus in a range of about 50,000 psi to about 120,000 psi, and a tensile strength in a range of about 2000 psi to about 3500 psi, and having enhanced optical properties for the overall packaging film gauge thickness comprising a haze in a range of about 1% to about 10% so that the packaging film is clear and a product can be seen easily through the packaging film.

24. A packaging film according to claim 23, wherein the elastomer comprises a styrene butadiene copolymer, the polyolefin is selected from the group consisting of polyethylene and polypropylene, and the increase in modulus allows the packaging film to be readily usable with packaging machinery at relatively high speeds and provides packaging film having preselected optical and mechanical properties.

25. A packaging film according to claim 24, wherein the elastomer comprises at least one of the following compounds: polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, and methyl methacrylate alkyl acrylate butadiene styrene copolymer.

26. A packaging film according to claim 25, wherein the polyolefin comprises at least one of the following compounds: polyethylene homopolymer, polypropylene homopolymer, ethylene/α-olefin copolymer, propylene/ethylene copolymer, and ethylene/unsaturated ester copolymer.

27. A packaging film according to claim 23, wherein the measurement of shrink in the transverse direction is further in a range of 10% to about 60% so that the packaging film shrinks sufficiently to securely restrain the product within the packaging film.

28. A packaging film according to claim 27, wherein the packaging film has a 45° gloss in a range of about 70% to about 110% so that the packaging film is shiny and product can be seen easily through the packaging film.

29. A packaging film according to claim 23, wherein the packaging film has a film gauge thickness in a range of about 0.5 to about 3 mil.

30. A packaging film according to claim 23, wherein the packaging film has a dart impact strength in a range of about 300 grams to about 1000 grams so that the packaging film is not punctured easily when an outside force is applied thereto.

* * * * *